United States Patent [19]

Miyamoto et al.

[11] 4,206,988

[45] Jun. 10, 1980

[54] VIEWFINDER FOR SINGLE LENS REFLEX CAMERAS

[75] Inventors: Takayoshi Miyamoto, Sakai; Takeshi Egawa, Sennan; Yasuo Yamazaki, Kawachinagano, all of Japan

[73] Assignee: Minolta Camera Kabushiki Kaisha, Osaka, Japan

[21] Appl. No.: 29,211

[22] Filed: Apr. 12, 1979

[30] Foreign Application Priority Data

Apr. 26, 1978 [JP] Japan ............................. 53-54581[U]

[51] Int. Cl.² ...................... G03B 13/02; G03B 19/12
[52] U.S. Cl. ................................... 354/152; 354/219
[58] Field of Search ................ 354/152, 155, 152 VS, 354/219 IF, 219, 154

[56] References Cited

U.S. PATENT DOCUMENTS

| | | | |
|---|---|---|---|
| 2,766,669 | 10/1956 | Weisse et al. | 354/152 VS UX |
| 3,613,543 | 10/1971 | Mita et al. | 354/152 VS UX |
| 3,902,183 | 8/1975 | Saito | 354/219 |
| 3,999,196 | 12/1976 | Inoue | 354/154 |
| 4,047,207 | 9/1977 | Altman et al. | 354/155 |
| 4,134,661 | 1/1979 | Ishizaka et al. | 354/152 VS UX |

FOREIGN PATENT DOCUMENTS

1010226  11/1965  United Kingdom ............... 354/219 IF

*Primary Examiner*—Donald A. Griffin
*Attorney, Agent, or Firm*—Jackson, Jones & Price

[57] ABSTRACT

A viewfinder for a single lens reflex camera of the T.T.L. light measurement type, wherein light measurement is apt to be affected by external light entering through an eyepiece, includes a diopter adjusting mechanism and an eyepiece shutter. The eyepiece is divided into at least a movable first optical element and a fixed second optical element. The diopter adjusting mechanism is capable of shifting the first optical element for diopter adjustment within a predetermined space which extends along the viewfinder optical axis and is at least partially common to a space that the eyepiece shutter occupies at an advanced position for blocking the viewfinder optical path. Operation of a manually operable member for shifting the eyepiece shutter toward the advanced positon causes the first optical element to be retracted toward the rear away from the predetermined space prior to the shift of the eyepiece shutter into the advanced position.

16 Claims, 7 Drawing Figures

VIEWFINDER FOR SINGLE LENS REFLEX CAMERAS

BACKGROUND OF THE INVENTION

1. Field of the Invention

The present invention relates to a diopter adjusting mechanism for a single lens reflex camera incorporating a photosensitive measurement of the light intensity of the object scene through the objective lens of the camera, and more particularly it relates to an improved viewfinder having an eyepiece shutter and diopter adjusting mechanism that is particularly compact.

2. Description of the Prior Art

A number of different viewfinders have been proposed for single lens reflex cameras that incorporate a shutter blind or shield such as U.S. Pat. Nos. 3,613,543 and 3,902,183. The purpose of these shields in a single lens reflex camera of the through the lens (TTL) light measurement type is to prevent external light from coming in through the eyepiece aperture which would produce errors in the resulting light measurement of the object scene. These errors can be excessive, particularly when the outside of the eyepiece is not covered by the face of the photographer, such as occurs in self timer photography.

An additional problem exists in the fact that photographers have limited and variable focusing powers of their own eyes. Thus it is often difficult for near sighted, far sighted or presbyopic persons to observe an image formed in front of the eye through the camera. There have been various suggestions in the prior art to provide diopter adjustment to the camera eyepiece, for example by moving the eyepiece along the optical axis. Movement of the eyepiece however, not only effects the viewfinder magnification but requires substantial space that is at variance with the design objectives of the compact cameras of today. Additionally, the incorporation of an eyepiece shutter can add additional space requirements in the design of the camera.

In view of the compact design objectives required in modern cameras along with the necessity of providing numerous ancillary features, such as the eyepiece shutter and diopter adjustment, there still remains a demand in the prior art to solve these specific problems.

SUMMARY OF THE INVENTION

An improved viewfinder for a single lens reflex camera of the through the lens light measurement type is provided. A pentagonal prism provides a viewfinder optical path that extends through an eyepiece assembly for observation by the viewer. A first and second optical element is provided between the eyepiece aperture and the pentagonal prism. The first optical element is movable along the optical path, while the second optical element is stationary adjacent the eyepiece aperture. A diopter adjustment mechanism comprising cams and levers is capable of adjustably relocating the first movable optical element when it is within a predetermined space extending along the viewfinder optical axis.

An eyepiece shutter is movable between an advance position wherein it blocks the viewfinder optical path and a retracted position wherein it is retracted from the viewfinder optical path. The first optical element can be spring biased and its position can be controlled by a pivoted lever controlled by a first cam member. A second cam member is capable of overriding the control of the first cam member and displacing the movable first optical element, at least when the movable lens is positioned in the normal travel of the eyepiece shutter. Thus, it is possible to provide a compact diopter adjustment while at the same time accomodating an eyepiece shutter in the same limited space.

The objects and features of the present invention which are believed to be novel, are set forth with particularity in the appended claims. The present invention, both as to its organization and manner of operation, together with further objects and advantages thereof, may be best understood by reference to the following description, taken in connection with the accompanying drawings.

BRIEF DESCRIPTION OF THE DRAWINGS

FIG. 3a is a partial cross sectional top view of the operating mechanism of the first embodiment of the present invention disclosed in FIG. 2a.

FIG. 3b is a rear view of the pivoting lever and cams on FIG. 3a;

DESCRIPTION OF THE PREFERRED EMBODIMENTS

The following specification taken in conjunction with the drawings sets forth the preferred embodiments of the present invention in such a manner that any person skilled in the camera field can reproduce the same.

Figure 1:
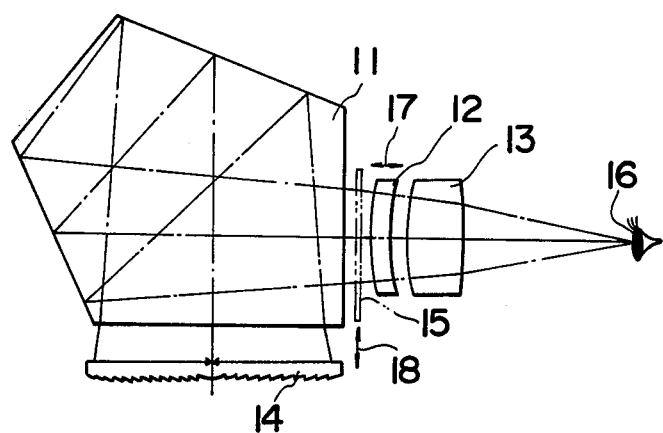
FIG. 1 is a schematic side view of a viewfinder according to the present invention disclosing the relative position of the operative elements.

Referring to FIG. 1, a viewfinder for a single lens reflex camera is disclosed in a schematic illustration.

While not disclosed, it is readily understood by persons skilled in this field that provision is made, frequently through windows or apertures within the viewfinder assembly for photoelectrically measuring the intensity of light in the object scene. The image, from the object scene, is introduced by an objective lens onto a focus plate 14. This image is then inverted, for example, right to left, by the pentaprism 11 as shown in FIG. 1 and observed through the optical elements 12 and 13 of the eyepiece assembly.

The eyepiece assembly is divided into at least 2 optical elements 12 and 13 for a diopter adjustment. The optical element 13 is a convergent or positive lens positioned on the image side of the optical element 12 and fixed to the camera body. The optical element 12 is a divergent or negative lens between the fixed lens 13 and the pentaprism 11. This negative lens is more powerful than the lens 13 and is movable along the optical axis, for example in the direction indicated by the arrow 17, relative to the viewer's eye 16. Diopter adjustment can be made as a result of shifting the position of the movable lens 12 along the optical axis.

Generally the (TTL) light measuring device will include a light receiving element (not shown) that can be mounted directly on the pentaprism 11 or on the focusing plate 14 in the viewfinder optical path. The light measuring device will measure a portion of the light in the optical path as it is received by the light receiving element. A possible error exists, when external light is incident from the direction of eye 16 through the eyepiece aperture and impinges upon the light receiving element. To prevent this from occurring in the present invention, an eyepiece shutter 15 is movably mounted between the pentaprism 11 and the movable lens 17. The direction of movement of this eyepiece shield or shutter 15 is indicated by the arrow 18 and varies between the advanced position disclosed in FIG. 1, wherein it blocks the viewfinder optical path and a retracted position wherein it is retracted from the optical path.

Figure 2A:
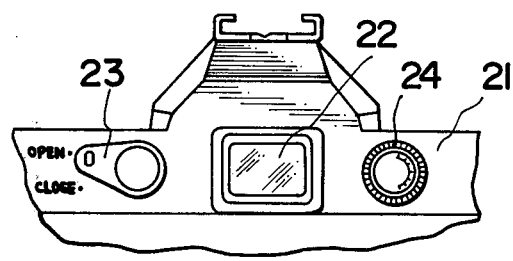
FIG. 2a is a partial rear view of one embodiment of the present invention.

Referring to FIG. 2a, a control knob 24 having an appropriate indicia scale, is rotably mounted on the camera housing 21 and provides an operating member for externally controlling the position of the movable lens 12. The eyepiece shutter 15 is in turn controlled by a pivotably mounted lever 23 that can operate between an open and closed position as noted by the indicia on the exterior of the camera house 21. The eyepiece aperture 22 is centrally located for utilization by the photographer.

Figure 2B:
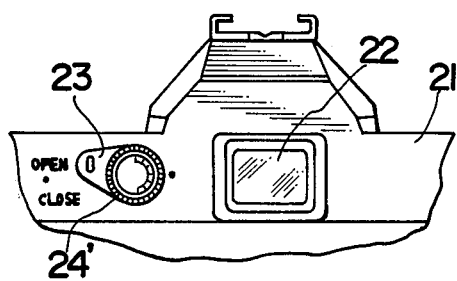
FIG. 2b is a partial rear view of another embodiment of the present invention.

FIG. 2b discloses an alternative control mechanism for the present invention wherein the operating member 23 is physically integrated with a diopter control 24' and they are both axially and rotably mounted together on one side of the eyepiece aperture 22.

Figure 3A:
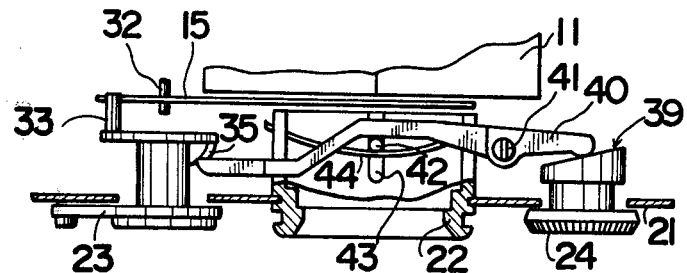
Figure 3B:
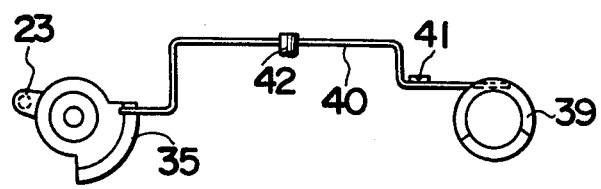
Figure 4A:
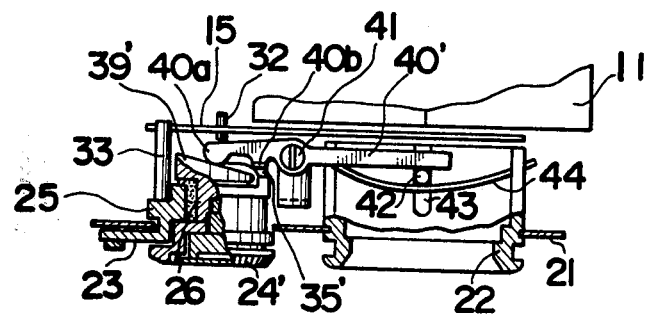
FIG. 4a is a partial cross sectional top view of the second embodiment of the present invention disclosed in FIG. 2b.
Figure 4B:
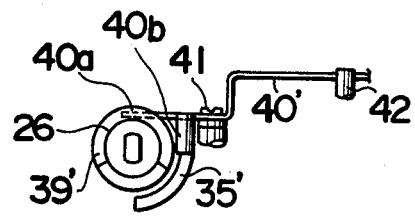
FIG. 4b is a partial rear view of the cams and lever of the second embodiment.

Examples of the operating mechanism disclosed in the embodiment of FIG. 2a are illustrated respectively in FIGS. 3a and 3b, while those of the operating mechanism disclosed in FIG. 2b are illustrated respectively in FIGS. 4a and 4b.

Referring specifically to the embodiment of FIG. 3a, the diopter operating member 24 is rotatably mounted in the camera housing 21 and extends internally within the camera housing to provide a camming surface 39. The camming surface 39 contacts a pivotable lever 40 that is supported on a shaft 41 and carries a follower surface at its end for contact with the cam surface 39. The movable lens 12 is appropriately mounted, for example within a lens barrel (not shown) having a pin 42 engaging a groove 43 that is aligned parallel to the optical axis of the viewfinder path relative to the camera body. A spring, such as a leaf spring 44, biases the movable lens element towards pentaprism 11.

The lever 40 directly engages the pin 42 and is capable of displacing it along the length of the groove 43. On the other side of the eyepiece aperture 22, the operating member 23 is also pivotably mounted and provides an internal camming surface 35 that is capable of also contacting and moving the lever 40 at least for a limited travel. An axially offset pin 33 contacts one end of the eyepiece shutter 15 that is pivotably supported by a shaft 32. Rotation of the operating lever 23 likewise rotates the eyepiece shutter 15 about the shaft 32 wherein it can be advanced into or retraced from the viewfinder optical path.

The spring 44 biases the pivotable lever 40 for movement in a clockwise rotation as shown in FIG. 3a causing one arm of the lever 40 to be engaged with cam 39. Cam 35 contacts the other side of the lever 40, both with regards to the pivot point 41 and also with regards to the surface of the lever 40. The rotational relationship between the cam 35 and the offcenter pin 33 is arranged such that when the cam 35 causes the interlocking lever 40 to rotate counterclockwise against the action of spring 44, the pin 42 is moved away from the pentaprism 11 thereby assuring that the shutter 15, when it is rotated by the offcenter pin 33 can move into an advanced position wherein it blocks the viewfinder optical path. As can be readily appreciated, the purpose of cam 35 is to insure that it will prevent any interference between the movable lens 12 and the travel path of the eyepiece shutter 15. As can be appreciated, if the eyepiece lens 12 is already positioned along the optical path so that it will not block the travel of the eyepiece shutter 15, it is not necessary to design the cam 35 to override the control of the cam 39. This particular arrangement, however, permits the cam 35 to override any adjustment of the cam 39 when necessary to assure clearance in the movement of the eyepiece shutter 15. Thus, this design permits a permissive range of movement of the movable lens 12 to traverse the optical path closed position of the eyepiece shutter 15 to assure a compact configuration.

Referring to FIGS. 4A and 4B, an alternative embodiment of the shutter and diopter operating member controls, as illustrated in FIG. 2B, is provided. The diopter operating member 24' is connected to a shaft 26 that extends within the eyepiece shutter control member 23. The rotation shaft 26 is loosely and concentrically fitted within a shaft 25 of the operating member 23 and terminates in a cam surface 39' at the end of the shaft 26. A pivotable lever 40' includes a contact follower surface 40A which interfaces with the cam 39'. The pivotal lever 40' rotates about the shaft 41 and engages the pin 42 of the movable lens 12. Again the guide groove 43 is positioned as mentioned in the embodiment of FIG. 3A. Pin 42 is further biased by the spring 44 against the pivotal lever 40'. This spring biasing force causes the lever 40' to rotate counterclockwise so that the contact follower 40A is held against the cam surface 39'.

An additional cam 35' is formed at a circumferential surface of the shaft 25 which is connected to the eyepiece shutter operating member 23. An off-center pin 33 is further carried by the shaft 26 at an off-axial position. This off-axial pin 33 engages the eyepiece shutter 15 for pivotal movement about the shaft 32 relative to the camera body. Thus, the rotational operation of the operating member 23 causes the eyepiece shutter 15 to block or open the viewfinder optical path.

The pivotal lever 40' is also provided with a second contact surface 40B which engages the cam 35'.

To effectuate diopter adjustment the diopter operating member 24' causes the cam 39' to move the pin 42 along the guide route 43 in a direction away from the pentaprism 11 by rotating the pivotable lever 40' against the force of the spring 44. When it is desired to block the viewfinder optical path by the eyepiece shutter 15, the operating member 23 is rotated counterclockwise towards the CLOSE indicia mark set forth in FIGS. 2A and 2B. This motion causes the off-axial pin 33 to rotate the eyepiece shutter 15 about the shaft 32 to insert the eyepiece shutter 15 within the optical path of the viewfinder and also within the normal range of travel of the movable lens 12. During this rotation of the operating member 23, the cam 35' pushes the second contact follower 40B thereby causing the pivotal lever 40' to rotate on shaft 41, whereby the movable lens 12 is moved furthermost away from the pentaprism 11 regardless of the diopter adjustment. Accordingly, although the movement paths for both the eyepiece shutter 15 and the movable lens 12 both intersect and are common in part, the movable lens 12 does not prevent the eyepiece shutter 15 from blocking the viewfinder optical path. Rotation of the operating member 23 clockwise toward the OPEN position will cause the eyepiece shutter 15 to retract from the viewfinder optical path and permit the movable lens 12 to be returned by the force of spring 44 to its original position wherein the diopter adjustment is automatically restored.

While the above embodiment have been disclosed at the best mode presently contemplated by the inventors, it should be realized these examples should not be interpreted as limiting, because artisans skilled in this field, once given the present teachings, can vary from these specific embodiments. Accordingly, the scope of the present invention should be determined solely from the following claims wherein we claim:

What is claimed:

1. A viewfinder for a single lens reflex camera of the through the lens light measurement type capable of operative connection to a camera housing, comprising:
   a pentagonal prism through which a viewfinder optical path extends;
   an eyepiece arranged behind said pentagonal prism such that said viewfinder optical path also extends therethrough and including a movable first optical element and a fixed second optical element, said first optical element being arranged between said pentagonal prism and said second optical element and movable along a viewfinder optical axis extending through said eyepiece;
   a diopter adjustment mechanism for adjustably locating said first optical element within a predetermined space extending along said viewfinder optical axis for diopter adjustment;
   an eyepiece shutter movable between an advanced position wherein it blocks said viewfinder optical path and a retracted position wherein it is retracted from said viewfinder optical path;
   first means for shifting said first optical element toward the rear away from the prism, through said predetermined space along said viewfinder optical axis; and
   second means for shifting said eyepiece shutter from said retracted position to said advanced position, said predetermined space being at least partially common to the space which said eyepiece shutter at said advanced position occupies.

2. A viewfinder as in claim 1, wherein said first and second means include a common first manually operable member such that operation of said first manually operable member causes said first means to shift said first optical element toward the rear, outside of said predetermined space along said viewfinder optical axis, while causing said second means to shift said eyepiece shutter from said retracted position to said advanced position.

3. A viewfinder as in claim 2, wherein said first means includes a cam member for shifting said first optical element toward the rear outside of said predetermined space prior to the shift of said eyepiece shutter from said retracted position to said advanced position.

4. A viewfinder as in claim 3, wherein said diopter adjustment mechanism includes a second manually operable member operable for the diopter adjustment, said first and second manually operable members being disposed on said camera housing at opposite sides of said eyepiece.

5. A viewfinder as in claim 3, wherein said diopter adjustment mechanism includes a second manually operable member operable for the diopter adjustment, said first and second manually operable members being disposed on said camera housing at one side of said eyepiece.

6. A viewfinder as in claim 2 wherein said second means further overrides the control of said first means for relocation of said first optical element, at least when said first optical element occupies the predetermined space common to said shutter advanced position.

7. A viewfinder as in claim 6 wherein a spring biases said first optical element towards said prism.

8. A viewfinder as in claim 6 wherein said first and second means each include a cam member and said first manually operable member is pivotally mounted between said cam members and contacts each respective cam in a follower movement relative to said cam surfaces.

9. An improved viewfinder for a single lens reflex camera having the capability to measure light intensity of an object scene through the objective lens of the camera, and providing means to define a viewfinder optical path for permitting the viewer to focus through the objective lens, the improvement comprising;
   means for adjusting the diopter power of the viewfinder to accommodate the eyesight of the viewer including an eyepiece aperture and at least one movable lens;
   an eyepiece shutter movable between a retracted position out of the viewfinder optical path and a closed position in the optical path that blocks the introduction of light rays from the eyepiece aperture to prevent the introduction of ambient light, the permissive range of movement of the movable lens traversing the optical path closed position of the eyepiece shutter, and
   means for displacing the movable lens during the activation of the eyepiece shutter to its closed position when the movable lens is positioned within the normal travel of the eyepiece shutter.

10. The invention of claim 9 wherein the means for displacing includes a first member for translating the movable lens along the optical axis away from the normal closed position of the eyepiece shutter.

11. The invention of claim 10 wherein the movable lens is biased in one direction by a biasing member.

12. The invention of claim 10 wherein the means for adjusting includes a first cam member for variable displacement of the first member to vary the diopter power.

13. The invention of claim 12 wherein the means for displacing includes a second cam member to move the movable lens regardless of the action of the first cam member, at least when the movable lens is positioned in the normal travel of the eyepiece shutter.

14. The invention of claim 13 wherein the first member is pivotally mounted and the first cam member contacts the first member on one side of the pivot point while the second cam member contacts the first member on the other side of the pivot point.

15. The invention of claim 13 wherein the first member is pivotally mounted and the first and second cam members both contact the first member on one side of the pivot point.

16. The invention of claim 13 wherein the second cam member further operatively moves the eyepiece shutter.

* * * * *